Figure 1:
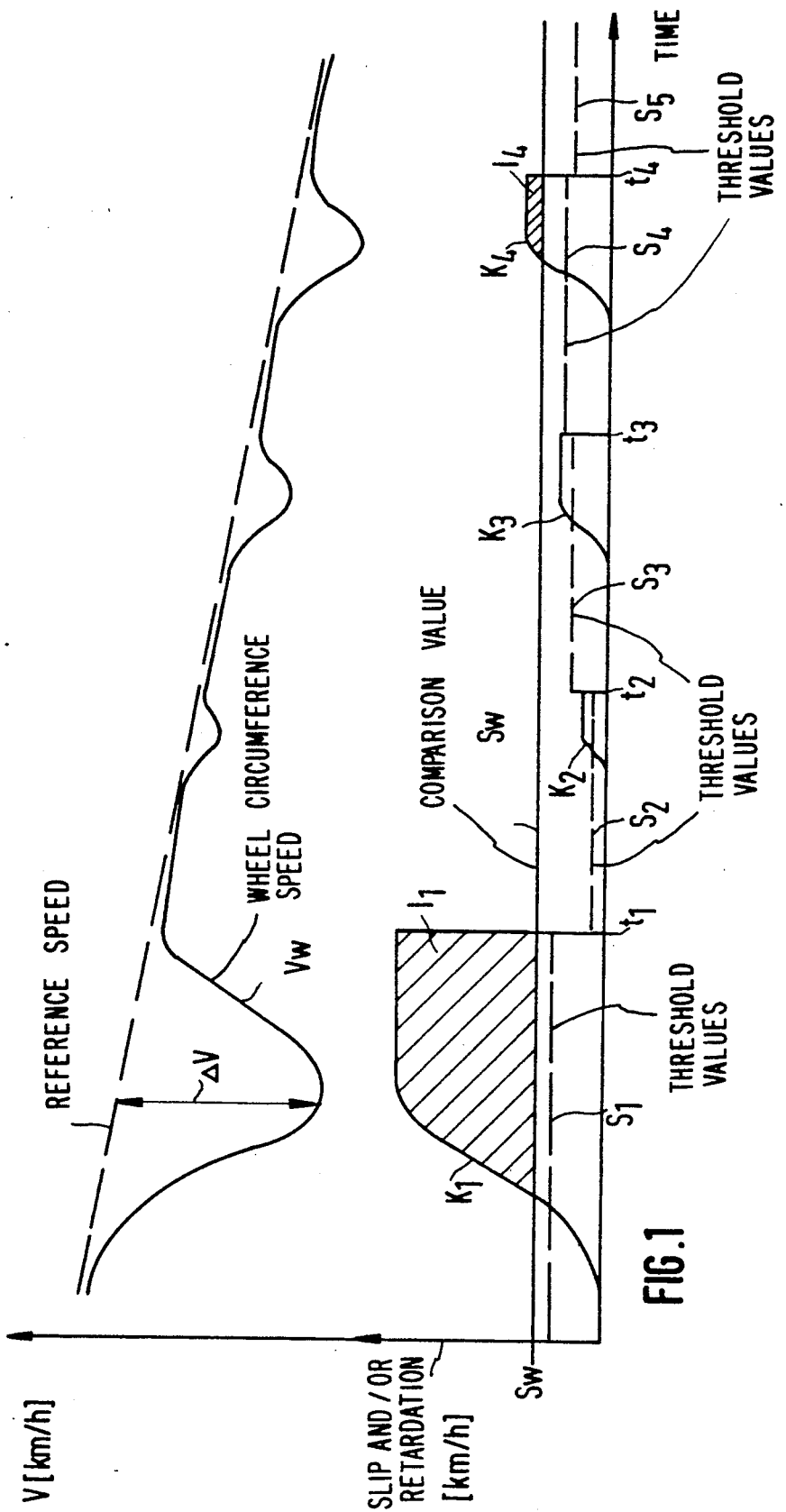

United States Patent [19]

Braschel

[11] Patent Number: 5,029,089
[45] Date of Patent: Jul. 2, 1991

[54] BRAKE PRESSURE CONTROL METHOD

[75] Inventor: Volker Braschel, Neuwied, Fed. Rep. of Germany

[73] Assignee: Lucas Industries public limited company, Birmingham, England

[21] Appl. No.: 313,939

[22] Filed: Feb. 23, 1989

[30] Foreign Application Priority Data

Feb. 26, 1988 [DE] Fed. Rep. of Germany ....... 3806213

[51] Int. Cl.⁵ .............................................. B60T 8/34
[52] U.S. Cl. .................................. 364/426.02; 303/95
[58] Field of Search ..................... 364/426.02, 724.09, 364/426.01; 303/109, 105, 106, 107, 93, 116, 95-97; 180/197

[56] References Cited

U.S. PATENT DOCUMENTS

| | | | |
|---|---|---|---|
| 3,951,466 | 4/1976 | Guagliumi et al. | 303/103 |
| 4,036,536 | 7/1977 | Quon | 303/97 |
| 4,136,912 | 1/1979 | Hesse et al. | 364/426.02 |
| 4,230,375 | 10/1980 | Leiber | 303/105 |
| 4,321,676 | 3/1982 | Ohmori et al. | 364/426.02 |
| 4,530,059 | 7/1985 | Brearley et al. | 364/426.02 |
| 4,651,281 | 3/1987 | Masaki et al. | 364/426.02 |
| 4,665,490 | 5/1987 | Masaki et al. | 364/426.02 |
| 4,729,608 | 3/1988 | Fennel et al. | 364/426.02 |
| 4,736,994 | 4/1988 | Fennel et al. | 364/426.02 |
| 4,739,484 | 4/1988 | Fennel | 303/103 |
| 4,818,037 | 4/1989 | McEnnan | 364/426.02 |
| 4,824,184 | 4/1989 | Spadafora et al. | 364/426.02 |
| 4,900,099 | 2/1990 | Braschel | 303/95 |
| 4,912,744 | 3/1990 | Hurst | 303/95 |

FOREIGN PATENT DOCUMENTS 2151732A 7/1985 United Kingdom .

Primary Examiner—Gary Chin
Attorney, Agent, or Firm—Scrivener and Clarke

[57] ABSTRACT

A method of controlling the brake pressure in an antilock vehicle braking system provides for determining the deviation of a control magnitude, such as the slip or retardation of a wheel, from a given rated value Sw in the course of a control cycle. A threshold value which is decisive for the pressure decrease at a wheel subject to the risk of becoming locked is changed for the next successive control cycle in response to the amount of the deviation of the control magnitude from the rated value.

6 Claims, 3 Drawing Sheets

BRAKE PRESSURE CONTROL METHOD

The invention relates to a method of controlling the brake pressure in an anti-lock vehicle brake system, wherein a control magnitude determined by the rotational behavior of a braked wheel, such as the slip and/or retardation of the wheel is measured and the brake pressure is lowered if a variable threshold value is exceeded and is subsequently raised again.

In the case of vehicle brakes furnished with an anti-lock system the rotation of the individual wheels of the vehicle is monitored constantly and particularly the slip of the braked wheels and their retardation are determined in order to detect a tendency of the wheel to become locked and prevent such locking. The further rise of pressure in the brake of the wheel concerned is terminated or the brake pressure reduced as soon as the wheel slip or retardation indicate a locking tendency, a circumstance which is ascertained by the fact that certain predetermined threshold values relating to slip and/or retardation are surpassed.

The pressure in the brake is increased once more as soon as the wheel concerned has experienced sufficient rotary acceleration by virtue of its friction with the road surface in order to achieve further braking effect with this particular wheel.

The question with the anti-lock brake pressure control mainly is to have the wheels at which brakes are applied run in the most favorable range of the known friction coefficient/slip curve during all the control cycles of a braking action.

It is known that this goal can be accomplished more readily if the threshold value is varied in response to measured parameters. For instance, in accordance with DE-OS 33 45 729, the threshold value which is decisive to initiate the control is changed in response to the starting acceleration of the controlled wheel during the preceding control cycle in order to suppress undesired control operations caused by axle oscillations and the like.

DE-PS 27 06 278 describes an anti-lock control system with which the period of duration of the control cycles is measured permanently. The threshold value and/or a filtering or delay procedure decisive for initiating a control operation is/are changed in response to the period duration measured of one control cycle. If the duration is very short, the delay period or the threshold value is increased, whereas either of them is decreased if the period of duration is long.

It is an object of the invention to develop a method of adjusting a threshold value or delay period such that the peripheral speed of the braked wheel, if at all possible, will remain within the most favorable range of the coefficient-of-friction/slip curve during braking and, at the same time, the initiation of undesired control operations is filtered out.

This object is met, in accordance with the invention, in the case of a method providing for variation of the threshold value in that the deviation of the slip/retardation from a given rated value is determined during at least one control cycle and the threshold value of at least the next successive control cycle is changed in response to such deviation.

In the case of a method providing for delaying a control cycle to prevent undesired pressure decreasing, the object is met, according to the invention, in that the deviation of the rotational behavior from a given comparison value is determined during at least one control cycle and the filtering of at least the next successive control cycle is adjusted in response to such deviation.

The invention thus is based on the finding that a braking operation can be optimized, as regards the stopping distance, lateral guidance, and stability, if the threshold value or a delay period (variation of the threshold value also may be understood as a kind of delay) is adjusted in response to the extent by which the slip retardation rotational behavior of a braked wheel surpasses or falls short of a given rated value during the preceding control cycle.

Because those skilled in the art are familiar with the control or rotational behavior of a braked wheel and their associated threshold values (e.g. from BOSCH TECHNISCHE BERICHTE, vol. 7, 1980, no. 2 pages 65 to 94) these need not be explained in detail here. Rotational behavior above all is slip $\Delta v$ of the braked wheel as related to a reference speed and the rotational retardation of the wheel. It is likewise known to combine both control magnitudes of slip and retardation and the associated threshold values. The threshold value which is decisive for initiating control (i.e. pressure reduction) is varied in a manner such as to become lower or the delay time to become shorter in the event that the deviation of slip/retardation magnitude are rather great since this will help avoid too wide a control swing, i.e. large deviations of the rotational behavior being monitored from its optimum course which is close to the reference speed. This means that the next successive control cycle will find a more sensitive threshold or be subjected to less delay so that the deviation of slip/retardation will become level at a comparison value at which the lateral guidance and capability of steering of the wheel remain sufficient and yet the wheel turns in the most favorable range of the coefficient-of-friction/slip curve.

A preferred modification of the invention provides for the comparison value, which is decisive for comparing the control deviations, to be changed in response to the vehicle speed. The rated or desired comparison value can be adjusted at a higher level for great vehicle speeds than for lower vehicle speeds.

In another embodiment of the method according to the invention, the comparison value with which the control magnitude is compared is adjusted by the wheel circumference acceleration determined upon initiating a braking operation, i.e. during the first control cycle. It is obvious that the acceleration of the wheel periphery may have positive or negative values. In case of negative values there is a deceleration of the wheel circumference. A rather small comparison value is adjusted for large wheel circumference decelerations as well as small wheel circumference accelerations. Inversely, the comparison value is raised for small wheel circumference decelerations and large wheel circumference accelerations.

The occurrence of extremely large wheel circumference accelerations may be an indication that the road surface is very poor. Extremely great accelerations of a wheel are generated, for instance, by pot holes or axle vibrations. A quick succession of accelerations and decelerations of the wheel circumference (+b and −b signals) likewise may be an indication that the road surface is very poor and has irregular coefficients of friction, holes, etc. If the indicators mentioned signal poor quality of the road surface, it is preferred to set a high comparison value so as to avoid under-braking.

In the event of a strong retardation of the vehicle (for an explanation of this expression see BOSCH TECHNISCHE BERICHTE, vol. 7, 1980, no. 2, pages 65 to 94) it may be assumed that the coefficient of adherence (also called brake pressure coefficient) is rather high between the tire and the road surface. In that case it is prefered to set a rather low rated value for comparison with the control magnitude in order to realize a braking operation which does not irritate the driver and is largely "free of jolts".

In accordance with another modification of the invention it is provided that the deviation of slip from the rated value are integrated over a number of successive control cycles and that the threshold value or a delay period is adjusted in response to the integral. In this event the adjustment of the threshold value or filtering time takes into account the data contained in the measurement of deviations during a plurality of cycles.

The invention is useful also with so-called anti-spin control (ASR). Anti-spin control already is effected with the state of the art by means of the anti-lock control systems described. Anti-spin control serves to prevent a wheel from spinning upon starting a vehicle, especially on a slippery road surface. Anti-spin control thus warrants that the maximum torque will be transmitted from the tires to the road surface when a vehicle is accelerated. The driving wheels of a motor vehicle usually comprise a so-called differential gear. The driving power is not transmitted to the wheels on a continuous axle but instead by way of the differential gear which comprises two shafts having the same torque but different rotation rates. If a wheel of the vehicle spins, consequently also the other (non-spinning) wheel is driven at a correspondingly lower torque so that the wheels as a whole do not transmit the maximum torque to the road surface. In accordance with the known starting spin control systems, therefore, a likewise known anti-lock brake system is used to monitor also the rotational behavior of the wheels as to any possible spinning. To accomplish that, it is determined whether or not the rotational acceleration of a wheel is greater than a predetermined threshold value which is dependent on the acceleration obtainable by the vehicle on an ideal road surface. As soon as given threshold values regarding the rotational acceleration of the wheel are exceeded, the respective wheel is braked positively and automatically (i.e. without any need for the driver to actuate the brake pedal) so that an increased torque can be produced at the previously spinning wheel as well by way of the differential gear. This anti-spin control, too, is effected with a plurality of control cycles of quick succession, as is known to those skilled in the art.

The methods of the invention are applicable also in the anti-slip control. In that type of control an undesired exceeding of the threshold value may occur as well, particularly as a consequence of axle vibrations and the like. Such occurrences have the undesired result of a pressure build-up automatically taking place too soon at the wheel concerned.

Thus the invention also teaches a method of controlling the brake pressure in a vehicle brake system with anti-slip control wherein acceleration of the wheel is measured and brake pressure is generated if a threshold value is surpassed in order to prevent further spinning of the wheel. This method is characterized in that the deviation of the rotational acceleration of the wheel from a given rated comparison value is measured in the course of one control cycle and the threshold value of at least the next successive control cycle is changed in response to the amount of the deviation.

The teachings of claims 2 to 12 may be transferred in an analogous manner from anti-lock brake control to anti-slip control, i.e. from ABS to ASR.

Figure 2:
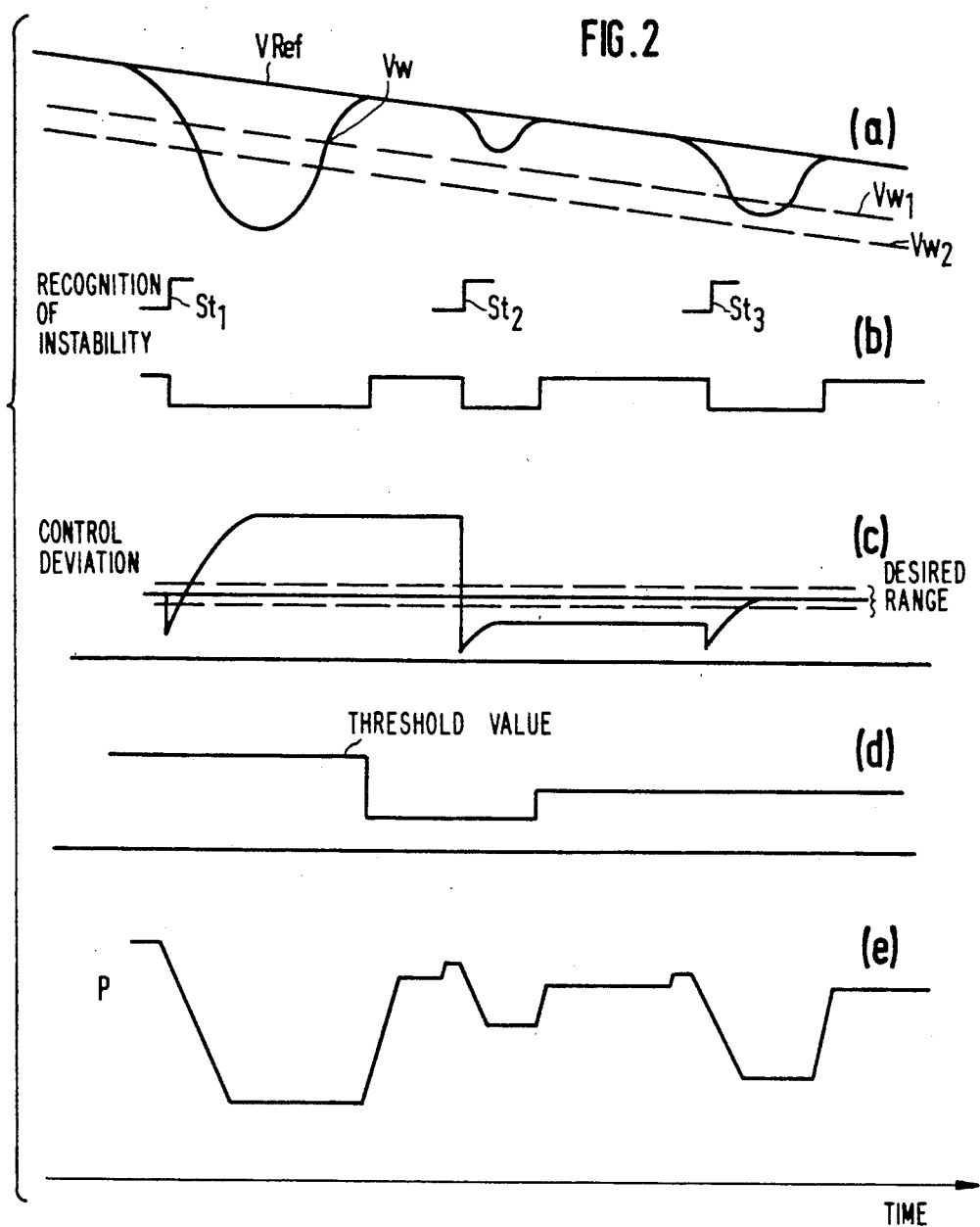
Figure 3:
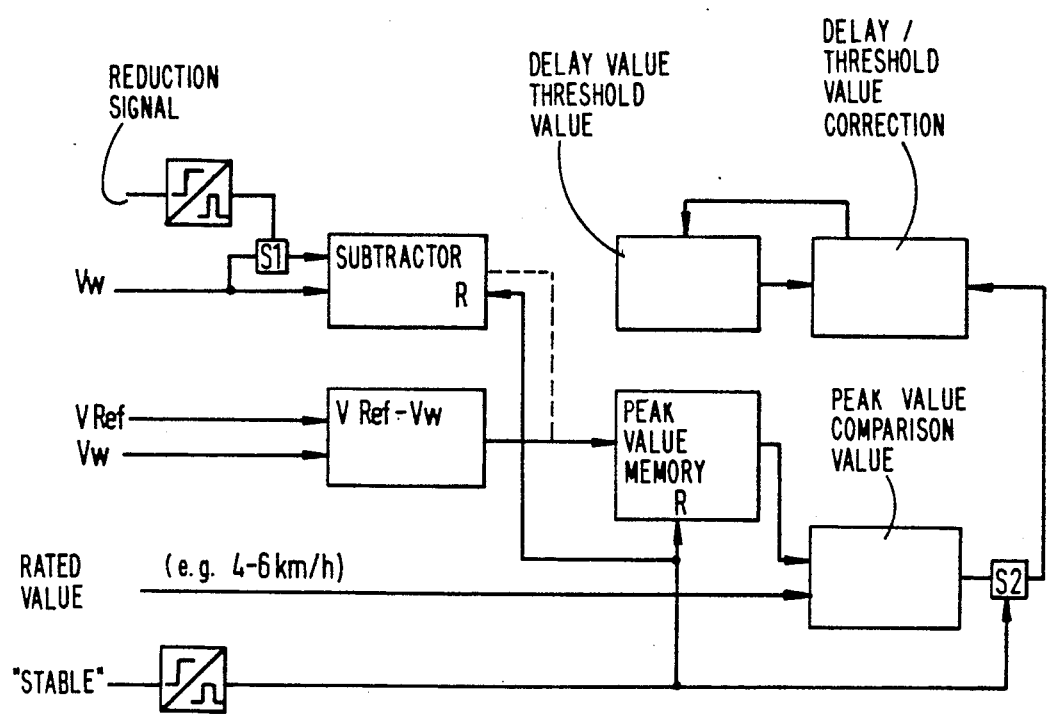

An embodiment of the invention will be described further below with reference to the accompanying drawings, in which:

FIG. 1 is a graph showing, above a common time scale, the course of the reference speed, the wheel circumference speed, the maximum value of the control magnitude reached during a control cycle (here: $\Delta v$) the rated value, and the threshold values adjusted accordingly;

FIG. 2 is a graphical presentation showing, above a common time scale, the course of the reference speed, the wheel circumference speed (FIG. 2a); the time sequence of occurrences of exceeding of the threshold value indicating so-called instable running of the wheel (FIG. 2b); the course of the deviation of the control magnitude (so-called control deviation) from the rated value (FIG. 2c); the course of the changed threshold value (FIG. 2d); and the course of the associated brake pressure (FIG. 2e); and FIG. 3 is a block diagram showing a circuit for carrying out a method according to the invention.

In the embodiment shown, the rotational behavior of used is the slip $\Delta v$ between the wheel circumference speed $v_w$ and the so-called reference speed $v_{ref}$. The sensors required for measuring the speed of the wheel circumference, the evaluation electronics, and the algorithms needed to form the reference speed are known to those skilled in the art (cf. e.g. the above mentioned BOSCH TECHNISCHE BERICHTE). Likewise known are the means for control of the brake pressure. Therefore, the specification below may be restricted to the essential aspects of the method according to the invention.

Four typical control cycles are shown diagrammatically in the figure. The rotational behavior of used is the slip $\Delta v$ of the wheel at which the brake is applied.

During a braking operation the slip of the braked wheel is monitored constantly. As soon as the slip exceeds a given threshold value S the brake pressure is reduced, possibly upon passing of a filtering or delay period, i.e. a period of time in which the reduction in brake pressure is retarded.

A previously adjusted threshold value $S_1$ is effective during the first control cycle. Moreover, a comparison value Sw is memorized in a processor which serves to process the signals and generator the control signals, and the instantaneous slip of the braked wheel is being stored consecutively. The slip has its maximum value at the minimum value of the wheel circumference speed $v_w$, and the curve $K_1$ corresponding to the respective instantaneous value of the slip up to the maximum value (curve $K_1$ is "frozen" at the maximum) reaches its terminal value here until the wheel circumference speed $v_w$ once more has attained approximately the reference speed $v_{ref}$ (time $t_1$). With the embodiment illustrated in the drawing, the curve $K_1$ representing the maximum value of the slip $\Delta v$ clearly surpasses the comparison value Sw. The integral $I_1$ between the straight line of the rated value and the curve $K_1$ is a measure of the deviation of the slip with respect to the comparison value and serves as the measure of the subsequent readjustment of the threshold value at the end of the first control cycle, i.e. at time $t_1$.

In view of the fact that the slip greatly exceeded the comparison value Sw during the first control cycle, the effective threshold value, at time $t_1$, is lowered considerably with respect to the previous starting threshold value $S_1$, the lower value being $S_2$, a value which causes more sensitive control. The comparison value Sw remains constant.

In accordance with the lower threshold $S_2$, the next control cycle is begun rather early and, therefore, entails a much smaller "swing" of the slip.

For this reason, curve $K_2$ which is formed analogously to curve $K_1$ lies entirely below the comparison value Sw. At the end of the second control cycle, at time $t_2$, therefore, the threshold value is raised to level $S_3$. The next control cycle again presents a course of the slip below the comparison value Sw so that at the end of this cycle, at time $t_3$, the threshold value is raised again, this time to the higher value $S_4$. The course of the maximum slip obtained during the fourth control cycle, as represented by curve $K_4$, once more lies above the comparison value Sw so that at the end of the fourth control cycle, at time $t_4$, the threshold value is lowered according to integral $I_4$ to the somewhat lower value $S_5$.

As may be taken from the drawing, the amount by which the threshold value is lowered or raised at the end of a control cycle depends on the extent by which the slip surpassed the comparison value Sw or failed to reach it. In other words, if the slip exceeds the comparison value Sw by a large amount, i.e. if the integral I is correspondingly great, then the subsequent lowering of the threshold value is of corresponding great extent (cf. threshold values $S_1$ and $S_2$). If, inversely, the course of the slip during one control cycle lies far below the comparison value Sw, the threshold value subsequently is raised just as distinctly (cf. threshold values $S_2$ and $S_3$).

The pressure increase at the wheel whose brake is applied is effected in each instance at the same rising gradient in the control cycles shown.

In the case of the embodiment illustrated the slip between the wheel circumference speed and the reference speed is used as the control magnitude. It is obvious to those skilled in the art that the control magnitude, analogously, also may be in particular the retardation of the wheel rotation.

With the embodiment illustrated, the comparison value Sw is constant. However, the comparison value also may rise with the velocity of the vehicle.

In the case of the embodiment described with reference to the figure the threshold value which becomes effective subsequently is changed in response to the extent of the deviation of the slip from the comparison value. It is possible as well to adjust delay in lowering of brake pressure (DE-PS 27 06 278) in response to the amount of the difference between the slip and the comparison value to adjust the delay time, instead of the threshold value. The filtering time thus takes the place of the threshold value described above. No control (pressure reduction) is initiated during the delay period even though the threshold value may be surpassed. If the deviation of the slip (e.g. curve $K_1$ in the drawing) exceeds the comparison value, the delay period is shortened, i.e. a more sensitive control is initiated. On the other hand, if the control magnitude remains below the comparison value Sw, the delay period is extended, i.e. less sensitive control is effected. Besides, it is obvious to those skilled in the art how the principles explained above with reference to the adjustment of the threshold value can be transferred to the adjustment of the delay period.

FIG. 2 shows how the slip "evens out" with the method of the invention after but a few control cycles, adopting a desired, favorable value. With the first control cycle, the wheel circumference speed $v_w$ still drops distinctly below the desirable range between lines $v_{w1}$ and $v_{w2}$. With the second control cycle, the wheel circumference speed remains above the desired range because of the threshold value which has been varied (FIG. 2d) (above line $v_{w1}$; FIG. 2a). However, in the third control cycle already, as shown in FIGS. 2a and 2c the wheel circumference speed remains in the desired rated value range because the threshold value has been raised in the meantime in accordance with the invention. Thereupon no further essential change of the threshold value is required. FIG. 2b shows the corresponding course of the stability or instability signals released by the threshold value being surpassed, in other words it shows the signals which indicate whether the wheel is turning in a stable (favorable) range of the coefficient-of-friction/slip curve or in an unstable range. The times at which instability is recognized, are marked $St_1$, $St_2$, and $St_3$.

The corresponding course of the brake pressure is shown in FIG. 2e.

Those skilled in the art nowadays are familiar with the means of circuitry suitable to generate the measuring and control signals to effect pressure increase and reduction in an anti-lock braking system for vehicles.

FIG. 3 is block diagram showing schematically a simple embodiment of means to control the brake pressure, at a fixed comparison value. In the block marked "$v_{ref} - v_w$" the difference is formed between the reference speed and the wheel circumference speed, which difference then is stored in the downstream peak value memory. Thereafter, the memorized peak value is compared in block "peak value—rated value" with the given rated value Sw. As the braked wheel passes over from stable to unstable condition, switch $S_2$ is closed briefly (see input "stable"). This leads to correction of the threshold value or delay period by way of the functional blocks marked accordingly. Instead of storing the difference $v_{ref} - v_w$, the difference between the wheel circumference speed at the time of the beginning of a pressure reduction and the actual, instantaneous wheel circumference speed may be stored in the peak value memory. To that end, switch $S_1$ is closed briefly at the beginning of a pressure reduction, thereby loading the wheel circumference speed into the subtracter. Thereafter, the difference between this memorized value and the instantaneous wheel circumference speed $v_w$ is formed on a continuous basis. As the wheel passes over into a stable state, the values memorized in the subtracter and the value in the peak value memory are erased.

In the following claims "rotational behavior value" means either "slip" or "retardation", or both, of a braked wheel as these terms are recognized in the field of anti-lock vehicle brake systems.

What is claimed is:

1. A method of controlling brake pressure in an antilock vehicle brake system comprising the steps of
   (a) measuring rotational behavior value of a braked wheel as a function of time,
   (b) establishing a predetermined comparison value (Sw) based on one of the fixed value, vehicle speed, vehicle deceleration, wheel circumference acceleration and wheel circumference deceleration, (c) comparing said rotational behavior value with said comparison value and with a variable threshold value during a first anti-lock control cycle in order to determine an amount of a deviation of said rotational behavior value from said comparison value, (d) lowering the brake pressure in the brake of said braked wheel when said rotational behavior value exceeds said variable threshold value ($S_1, S_2, S_3, S_4, S_5$), and (e) changing said threshold value in a second anti-lock control cycle following said first anti-lock control cycle in response to said amount of said determined deviation.

2. The method as claimed in claim 1, wherein said threshold value is lowered if said determined deviation exceeds said comparison value and wherein said threshold value is raised as long as said deviation remains below said comparison value.

3. The method as claimed in claim 1, wherein said measured rotational behavior value is slip and deviation of said slip from said comparison value (Sw) is integrated over time during a number of consecutive control cycles to obtain an integral and wherein said threshold value is adjusted in response to said integral.

4. A method of controlling brake pressure in an anti-lock vehicle brake system comprising (a) measuring rotational behavior value of a braked wheel as a function of time, (b) establishing a predetermined comparison value (Sw) based on one of the fixed value, vehicle speed, vehicle deceleration, wheel circumference acceleration and wheel circumference deceleration, (c) comparing said rotational behavior value with said comparison value and with a variable threshold value during a first anti-lock control cycle in order to determine an amount of a deviation of the rotational behavior value from said comparison value, (d) lowering the brake pressure in the brake of said braked wheel when said rotational behavior value exceeds said variable threshold value ($S_1, S_2, S_3, S_4, S_5$), and (e) delaying said lowering of brake pressure in the brake of said braked wheel for a predetermined period of time dependent on said amount of said deviation even if said threshold value is exceeded.

5. The method as claimed in claim 4, wherein said predetermined period of time is shortened if said determined deviation exceeds said comparison value (Sw) by a given extent and wherein said period of time is prolonged if the deviation remains below said comparison value.

6. The method as claimed in claim 4, wherein said determined deviation from said comparison value is integrated over time during a number of consecutive control cycles to obtain an integral and wherein said predetermined period of time is adjusted in response to said integral.

* * * * *